US012328163B2

(12) United States Patent
Avhar et al.

(10) Patent No.: US 12,328,163 B2
(45) Date of Patent: Jun. 10, 2025

(54) BEAMFORMING CODEBOOK OPTIMIZATION IN A WIRELESS COMMUNICATION SYSTEM (WCS)

(71) Applicant: CORNING RESEARCH & DEVELOPMENT CORPORATION, Corning, NY (US)

(72) Inventors: Yaniv Avhar, Yavne (IL); Benjamin Imanilov, Hod haSharon (IL); Shlomi Kaduri, Herzliya (IL)

(73) Assignee: ANI Acquisition Sub, LLC, Boca Raton, FL (US)

( * ) Notice: Subject to any disclaimer, the term of this patent is extended or adjusted under 35 U.S.C. 154(b) by 27 days.

(21) Appl. No.: 18/216,755

(22) Filed: Jun. 30, 2023

(65) Prior Publication Data
US 2025/0007572 A1    Jan. 2, 2025

(51) Int. Cl.
*H04L 23/02* (2006.01)
*H04B 7/04* (2017.01)
*H04B 7/0456* (2017.01)

(52) U.S. Cl.
CPC ....... *H04B 7/0456* (2013.01); *H04B 7/04026* (2023.05)

(58) Field of Classification Search
CPC .... H04B 7/043; H04B 7/0456; H04B 7/0408; H04W 52/0206; H04W 72/51
USPC ........................................ 375/262, 260, 267
See application file for complete search history.

(56) References Cited

U.S. PATENT DOCUMENTS

| | | | |
|---|---|---|---|
| 10,833,740 B1* | 11/2020 | Lin ...................... | H04B 7/0617 |
| 2019/0379464 A1* | 12/2019 | Ng ........................ | H04B 7/0617 |
| 2021/0289583 A1* | 9/2021 | Zhang .................. | H04B 7/0602 |
| 2021/0367644 A1* | 11/2021 | Xu ......................... | H04B 7/043 |
| 2024/0267096 A1* | 8/2024 | Prasad ................. | H01Q 15/148 |
| 2024/0314685 A1* | 9/2024 | Daniel ................. | H04B 7/0617 |

OTHER PUBLICATIONS

B. Imanilov, "Beamforming Synthesis for Initial Access Fairness in Wireless Networks," 2022 14th Global Symposium on Millimeter-Waves & Terahertz (GSMM), 2022, pp. 46-48.

\* cited by examiner

*Primary Examiner* — Khai Tran
(74) *Attorney, Agent, or Firm* — Greenberg Traurig, LLP; Mammen ("Roy") P. Zachariah

(57) ABSTRACT

Beamforming codebook optimization in a wireless communication system (WCS) is provided. In a WCS, a wireless node (e.g., base station) simultaneously emits multiple reference beams in a coverage area based on a set of codewords that is optimized for a specific number (a full or a partial set) of antenna elements in an antenna array. The wireless node is configured to determine a different set(s) of codewords that are fine-tuned for forming the reference beams from a different number of the antenna elements in the antenna array and steer the reference beams toward identical directions. During deployment of the wireless node, there may be dead zones or low coverage zones. Aspects of the present disclosure facilitate the discovery of these low-coverage zones using feedback from multiple deployed Internet of Things (IoT) devices. Based on the feedback, the codebook of codewords may be optimized to reduce or eliminate such low coverage zones. Such an approach reduces reliance on manual walk-throughs and complicated iterative processes currently in use.

11 Claims, 10 Drawing Sheets

BEAMFORMING CODEBOOK OPTIMIZATION IN A WIRELESS COMMUNICATION SYSTEM (WCS)

BACKGROUND

The disclosure relates generally to verifying wireless coverage through radio frequency (RF) beamforming in a wireless communication system (WCS), which can include a fifth-generation (5G) system, a 5G new-radio (5G-NR) system, and/or a distributed communication system (DCS).

Wireless communication is rapidly growing, with ever-increasing demands for high-speed mobile data communication. As an example, local area wireless services (e.g., so-called "Wi-Fi" systems) and wide area wireless services are being deployed in many different types of areas (e.g., coffee shops, airports, libraries, etc.). Communication systems have been provided to transmit and/or distribute communication signals to wireless nodes called "clients," "client devices," or "wireless client devices," which must reside within the wireless range or "cell coverage area" to communicate with an access point device. Example applications where communication systems can be used to provide or enhance coverage for wireless services include public safety, cellular telephony, wireless local access networks (LANs), location tracking, and medical telemetry inside buildings and over campuses. One approach to deploying a communication system involves the use of radio nodes/base stations that transmit communication signals distributed over physical communication medium remote units forming RF antenna coverage areas, also referred to as "antenna coverage areas." The remote units each contain or are configured to couple to one or more antennas configured to support the radio nodes' desired frequency(ies) to provide the antenna coverage areas. Antenna coverage areas can have a radius in a range from a few meters up to twenty meters, as an example. Another example of a communication system includes radio nodes, such as base stations, that form cell radio access networks, wherein the radio nodes are configured to transmit communication signals wirelessly directly to client devices without being distributed through intermediate remote units.

For example, FIG. 1 is an example of a WCS 100 that includes a radio node 102 configured to support one or more service providers 104(1)-104(N) as signal sources (also known as "carriers" or "service operators"—e.g., mobile network operators (MNOs)) and wireless client devices 106(1)-106(W). For example, the radio node 102 may be a base station (eNodeB) that includes modem functionality and is configured to distribute communication signal streams 108(1)-108(S) to the wireless client devices 106(1)-106(W) based on communication signals 110(1)-110(N) received from the service providers 104(1)-104(N). The communication signal streams 108(1)-108(S) of each respective service provider 104(1)-104(N) in their different spectrums are radiated through an antenna 112 to the wireless client devices 106(1)-106(W) in a communication range of the antenna 112. For example, the antenna 112 may be an antenna array. As another example, the radio node 102 in the WCS 100 in FIG. 1 can be a small cell radio access node ("small cell") that is configured to support the multiple service providers 104(1)-104(N) by distributing the communication signal streams 108(1)-108(S) for the multiple service providers 104(1)-104(N) based on respective communication signals 110(1)-110(N) received from a respective evolved packet core (EPC) network $CN_1$-$CN_N$ of the service providers 104(1)-104(N) through interface connections. The radio node 102 includes radio circuits 118(1)-118(N) for each service provider 104(1)-104(N) that are configured to create multiple simultaneous RF beams ("beams") 120(1)-120(Q) for the communication signal streams 108(1)-108(S) to serve multiple wireless client devices 106(1)-106(W). For example, the multiple RF beams 120(1)-120(Q) may support multiple-input, multiple-output (MIMO) communication.

The radio node 102 of the WCS 100 in FIG. 1 may be configured to support service providers 104(1)-104(N) that have a different frequency spectrum and do not share the spectrum. Thus, in this instance, the communication signals 110(1)-110(N) from the different service providers 104(1)-104(N) do not interfere with each other even if transmitted by the radio node 102 at the same time. The radio node 102 may also be configured as a shared spectrum communication system where the multiple service providers 104(1)-104(N) have a shared spectrum. In this regard, the capacity supported by the radio node 102 for the shared spectrum is split (i.e., shared) between the multiple service providers 104(1)-104(N) for providing services to the subscribers.

The radio node 102 in FIG. 1 can also be coupled to a distributed communication system (DCS), such as a distributed antenna system (DAS), such that the radio circuits 118(1)-118(N) remotely distribute the communication signals 110(1)-110(N) of the multiple service providers 104(1)-104(N) to remote units. The remote units can each include an antenna array that includes tens or even hundreds of antennas for concurrently radiating the communication signals 110(1)-110(N) to subscribers using spatial multiplexing. Herein, the spatial multiplexing is a scheme that takes advantage of the differences in RF channels between transmitting and receiving antennas to provide multiple independent streams between the transmitting and receiving antennas, thus increasing throughput by sending data over parallel streams. Accordingly, the remote units can be said to radiate the communication signals 110(1)-110(N) to subscribers based on a massive multiple-input multiple-output (M-MIMO) scheme.

The WCS 100 may be configured to operate as a 5G and/or a 5G-NR communication system. In this regard, the radio node 102 can function as a 5G or 5G-NR base station (a.k.a. eNodeB) to service the wireless client devices 106(1)-106(W). Notably, the 5G or 5G-NR wireless communication system may be implemented based on a millimeter-wave (mmWave) spectrum that can make the communication signals 110(1)-110(N) more susceptible to propagation loss and/or interference. Thus, during system installation providing ways to ensure that there are no dead spots of low or no coverage provides room for innovation.

SUMMARY

Embodiments disclosed herein include beamforming codebook optimization in a wireless communication system (WCS). In a WCS, a wireless node (e.g., base station) simultaneously emits multiple reference beams in a coverage area based on a set of codewords that is optimized for a specific number (a full or a partial set) of antenna elements in an antenna array. The wireless node is configured to determine a different set(s) of codewords that are fine-tuned for forming the reference beams from a different number of the antenna elements in the antenna array and steering the reference beams toward identical directions. During deployment of the wireless node, there may be dead zones or low coverage zones. Aspects of the present disclosure facilitate the discovery of these low-coverage zones using feedback from multiple deployed Internet of Things (IoT) devices. Based on the feedback, the codebook of codewords may be optimized to reduce or eliminate such low coverage zones. Such an approach reduces reliance on manual walk-throughs and complicated iterative processes currently in use.

One exemplary embodiment of the disclosure relates to a wireless node. The wireless node includes an antenna array comprising a plurality of antenna elements and configured to emit a predetermined number of radio frequency (RF) beams in a coverage area. The wireless node further includes a codeword synthesis circuit configured to send a first beam formed by a first codeword in a default codebook, send measurements responsive to the first beam from sensors in a coverage area to a remote server, and receive a new codebook from the remote server.

Another exemplary embodiment of the disclosure relates to a method for optimizing a codebook for radio frequency (RF) beamforming in a wireless communication system (WCS). The method includes sending, using an antenna array, a first beam formed by a first codeword in a default codebook, sending measurements responsive to the first beam from sensors in a coverage area to a remote server, and receiving a new codebook from the remote server.

Another exemplary embodiment of the disclosure relates to a wireless communication system (WCS). The WCS includes a centralized services node coupled to a service node. The WCS also includes at least one wireless node coupled to the centralized services node and comprising an antenna array comprising a plurality of antenna elements and configured to emit a predetermined number of radio frequency (RF) beams in a coverage area. The WCS further includes a codeword synthesis circuit configured to send a first beam formed by a first codeword in a default codebook, to send measurements responsive to the first beam from sensors in a coverage area to a remote server, and to receive a new codebook from the remote server.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding and are incorporated in and constitute a part of this specification. The drawings illustrate one or more embodiment(s) and, together with the description, serve to explain the principles and operation of the various embodiments.

DETAILED DESCRIPTION

Embodiments disclosed herein include beamforming codebook optimization in a wireless communication system (WCS). In a WCS, a wireless node (e.g., base station) simultaneously emits multiple reference beams in a coverage area based on a set of codewords that is optimized for a specific number (a full or a partial set) of antenna elements in an antenna array. The wireless node is configured to determine a different set(s) of codewords that are fine-tuned for forming the reference beams from a different number of the antenna elements in the antenna array and steer the reference beams toward identical directions. During deployment of the wireless node, there may be dead zones or low coverage zones. Aspects of the present disclosure facilitate the discovery of these low-coverage zones using feedback from multiple deployed Internet of Things (IoT) devices. Based on the feedback, the codebook of codewords may be optimized to reduce or eliminate such low coverage zones. Such an approach reduces reliance on manual walk-throughs and complicated iterative processes currently in use.

Before discussing a wireless node configured to optimize a beamforming codebook(s), a brief overview of a conventional beamforming system and how it may work in a WCS is first provided with reference to FIGS. 2A-4 to help explain some fundamental aspects related to radio frequency (RF) beamforming. A discussion of a process used to create an optimized codebook begins below with reference to FIG. 5.

Figure 1:
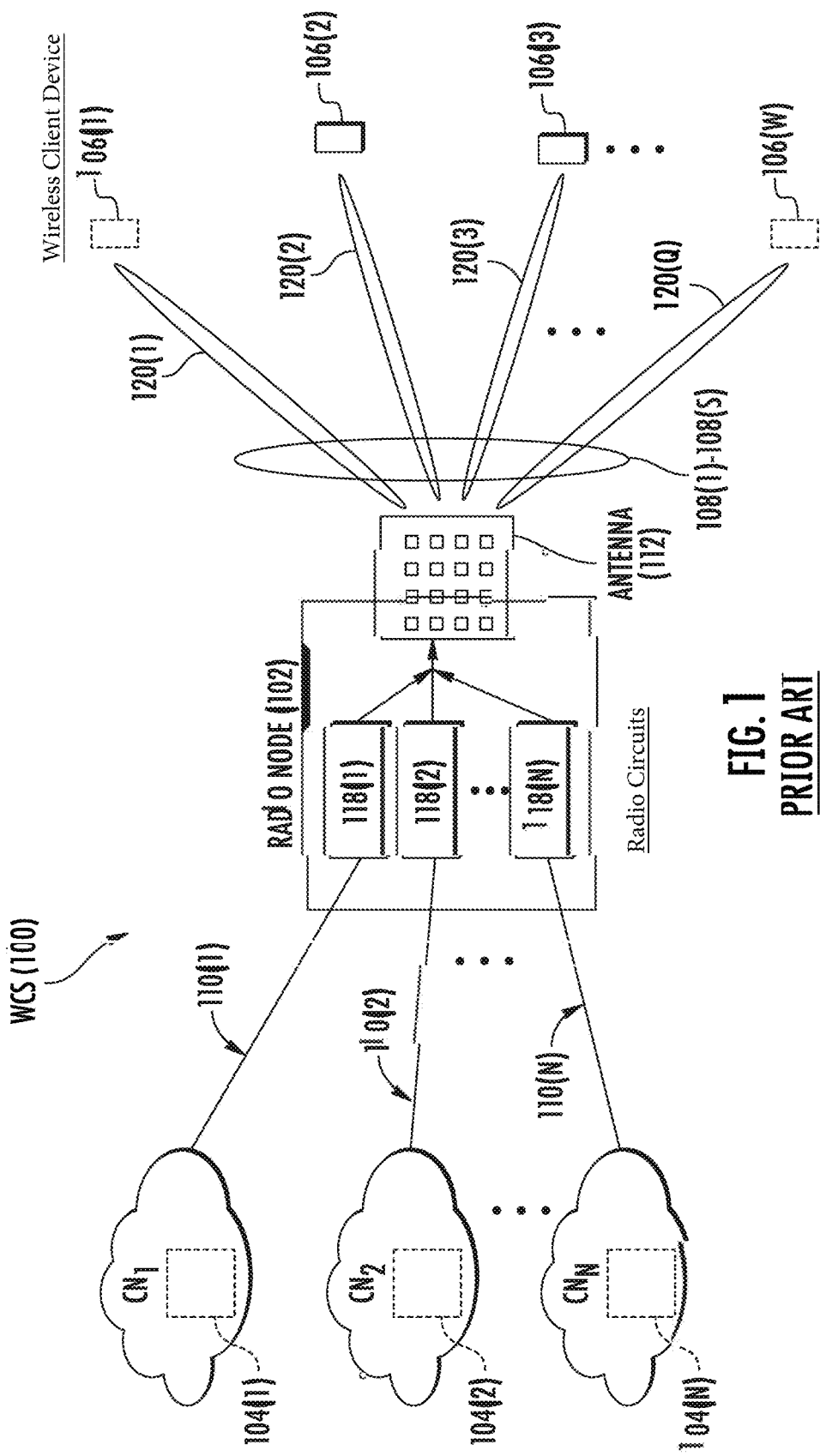
FIG. 1 is a schematic diagram of a conventional wireless communication system (WCS), such as a distributed communication system (DCS), configured to distribute communication services to remote coverage areas.
Figures 2A, 2B:
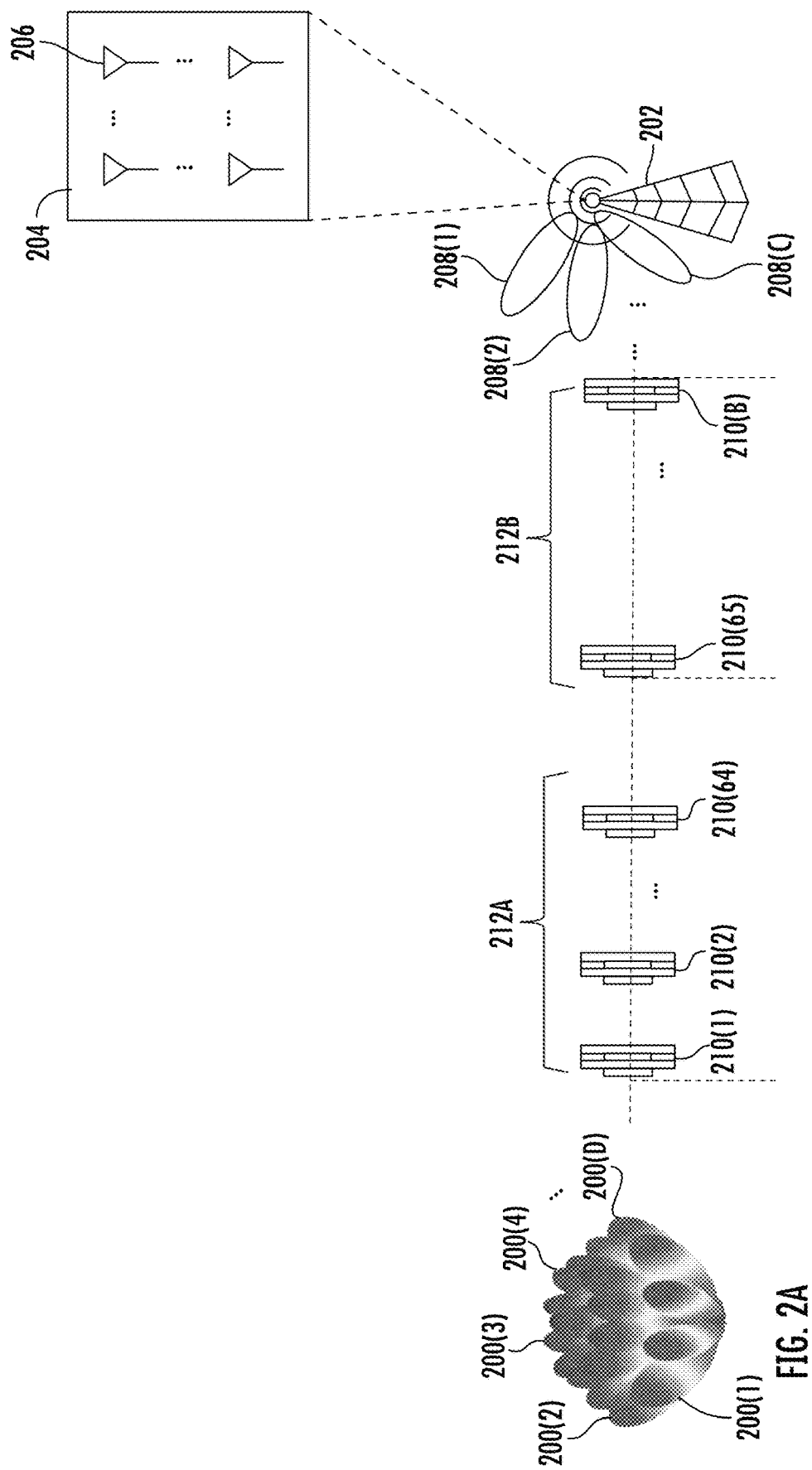
FIGS. 2A-2B are graphic diagrams providing exemplary illustrations of a number of fundamental aspects related to radio frequency (RF) beamforming.

In this regard, FIGS. 2A-2B are graphic diagrams illustrating fundamental aspects related to RF beamforming. In general, beamforming refers to a technique that uses multiple antenna elements to emit an RF signal. The antenna elements are typically organized into an antenna array (e.g., 4×4, 8×8, 16×16, etc.) and separated from each other by a distance (e.g., ½ wavelength). The RF signal emitted from the antenna elements is preprocessed based on a set of complex-valued coefficients, which is commonly known as a codeword. Specifically, the codeword is physically realized through phase and/or amplitude control applied at input of the antenna elements to thereby maximize array gain in a specific direction. By applying the set of complex-valued coefficients to the RF signal, the multiple simultaneously emitted RF signals can form a radiation pattern (a.k.a. RF beam) described by gain, intensity, power, and/or electric/magnetic field values versus elevation and azimuth directions. In this regard, it can be said that each RF beam is associated with or defined by a respective codeword. In other words, there is a one-to-one relationship between an RF beam and a codeword. Accordingly, a list of different codewords, often referred to as a codebook, can define multiple different RF beams. As illustrated in FIG. 2A, by preprocessing the RF signal based on different codewords, it may be possible to form multiple RF beams 200(1)-200(D) pointing to multiple directions.

Notably, the radiation pattern often includes a main lobe, where the radiation power is concentrated and close to a maximum radiated power, and one or more side lobes with lesser amounts of radiated power. Typically, a radiation direction of the main lobe determines a radiation direction of the RF beam, and a beam width of the RF beam is defined by a set of radiation directions of the radiation pattern wherein a radiated power is not lower than 3 dB from the maximum radiated power.

In the context of the present disclosure, the RF beams 200(1)-200(D) are known as control beams or reference beams that enable a user device to discover a transmitting base station. Although, in theory, it is possible to increase the number of the RF beams 200(1)-200(D) by defining more codewords, an actual number D of the RF beams 200(1)-200(D) is typically limited by a standard-defined parameter known as the synchronization signal block (SSB). FIG. 2B is a graphic diagram providing an exemplary illustration of how the SSB limits the actual number of the RF beams 200(1)-200(D) that may be formed by a wireless node 202 (e.g., gNB) configured to operate according to the third-generation partnership project (3GPP) standard.

As shown in FIG. 2B, the wireless node 202 includes an antenna array 204 having multiple antenna elements 206. To allow any user equipment (UE) in an intended coverage area to detect the wireless node 202, the wireless node 202 is configured to radiate periodically multiple reference beams 208(1)-208(C) (a.k.a. control beams) in different directions of the intended coverage cell. Like the RF beam 200(1)-200(D), each of the reference beams 208(1)-208(C) is formed based on a respective codeword as described above. The reference beams 208(1)-208(C) are each associated with a respective one of multiple SSBs 210(1)-210(B). Each of the SSBs 210(1)-210(B) may include such information as a primary synchronization signal (PSS), a secondary synchronization signal (SSS), and a 5G-NR physical broadcast channel (PBCH) to enable the UE to discover the wireless node 202.

According to a conventional beamforming approach, the wireless node 202 is configured to steer the reference beams 208(1)-208(C) sequentially toward different directions, which is often predetermined in the codewords in the coverage area. Accordingly, a UE can sweep through the reference beams 208(1)-208(C) to identify a candidate reference beam(s) associated with a strongest reference signal received power (RSRP). Further, the UE may decode a candidate SSB(s) associated with the identified candidate reference beam(s) to acquire such information as physical cell identification (PCI) and a PBCH demodulation reference signal (DMRS). Based on the candidate reference beam(s) reported by the UE, the wireless node 202 may pinpoint a location of the UE and subsequently steer a data-bearing RF beam toward the UE to enable data communication with the UE. The SSBs 210(1)-210(B) may be organized into an SSB burst set 212A, 212B to be repeated periodically based on a predefined SSB burst interval. The current 3GPP standard allows a maximum of 64 SSBs to be scheduled in the SSB burst set 212A. Accordingly, the wireless node 202 can radiate up to 64 reference beams 208(1)-208(C) during each SSB burst interval.

In one non-limiting example, under a normal operating condition, the wireless node 202 may be configured to emit a first predetermined number of the reference beams 208(1)-208(C) using all the antenna elements 206 in the antenna array 204 (e.g., all 64 antenna elements in an 8×8 antenna array). As such, the wireless node 202 will use a set of codewords (a.k.a. optimized codewords) that is optimized for all the antenna elements 206 in the antenna array 204 to form the first predetermined number of the reference beams 208(1)-208(C).

In another non-limiting example, under the normal operating condition, the wireless node 202 may be configured to emit a second predetermined number of the reference beams 208(1)-208(C) using a subset of the antenna elements 206 in the antenna array 204 (e.g., 32 out of 64 antenna elements in an 8×8 antenna array). As such, the wireless node 202 will use a set of codewords (a.k.a. optimized codewords) that is optimized for the subset of the antenna elements 206 in the antenna array 204 to form the second predetermined number of the reference beams 208(1)-208(C). As explained in greater detail below, there are instances where a particular set of codewords may generate dead spots or spots in the intended coverage where signal strength may be insufficient. Aspects of the present disclosure provide ways to detect and correct such situations.

Figure 3:
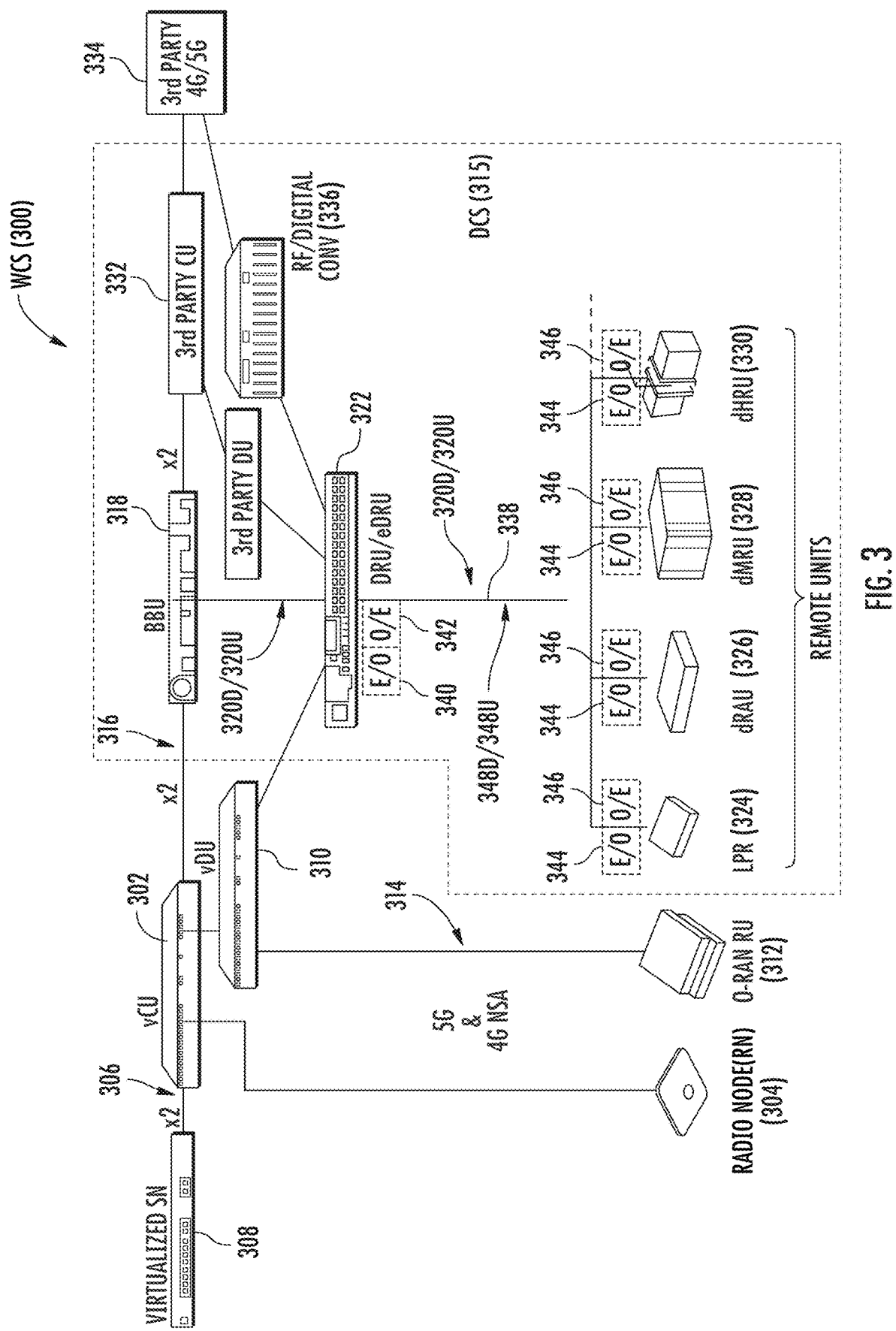
FIG. 3 is a schematic diagram of an exemplary WCS configured according to any of the embodiments disclosed herein.

FIG. 3 is a schematic diagram of an exemplary WCS 300 configured according to any of the embodiments disclosed herein to enable beamforming codebook optimization. The WCS 300 supports both legacy 4G LTE, 4G/5G non-standalone (NSA), and 5G standalone communication systems. As shown in FIG. 3, a centralized services node 302 is provided and is configured to interface with a core network to exchange communication data and distribute the communication data as radio signals to various wireless nodes. In this example, the centralized services node 302 is configured to support distributed communication services to a radio node 304 (e.g., 5G or 5G-NR gNB). Although only one radio node 304 is shown in FIG. 3, it should be appreciated that the WCS 300 can be configured to include additional numbers of the radio node 304, as needed.

The functions of the centralized services node 302 can be virtualized through, for example, an x2 interface 306 to another services node 308. The centralized services node 302 can also include one or more internal radio nodes that are configured to be interfaced with a distribution unit (DU) 310 to distribute communication signals to one or more open radio access network (O-RAN) remote units (RUs) 312 that are configured to be communicatively coupled through an O-RAN interface 314. The O-RAN RUs 312 are each configured to communicate downlink and uplink communication signals in a respective coverage cell.

The centralized services node 302 can also be interfaced with a distributed communication system (DCS) 315 through an x2 interface 316. Specifically, the centralized services node 302 can be interfaced with a digital baseband unit (BBU) 318 that can provide a digital signal source to the centralized services node 302. The digital BBU 318 may be configured to provide a signal source to the centralized services node 302 to provide downlink communication signals 320D to a digital routing unit (DRU) 322 as part of a digital distributed antenna system (DAS). The DRU 322 is configured to split and distribute the downlink communication signals 320D to different types of remote units, including a low-power remote unit (LPR) 324, a radio antenna unit (dRAU) 326, a mid-power remote unit (dMRU) 328, and a high-power remote unit (dHRU) 330. The DRU 322 is also configured to combine uplink communication signals 320U received from the LPR 324, the dRAU 326, the dMRU 328, and the dHRU 330 and provide the combined uplink communication signals to the digital BBU 318. The digital BBU 318 is also configured to interface with a third-party central unit 332 and/or an analog source 334 through a radio frequency (RF)/digital converter 336.

The DRU 322 may be coupled to the LPR 324, the dRAU 326, the dMRU 328, and the dHRU 330 via an optical fiber-based communication medium 338. In this regard, the DRU 322 can include a respective electrical-to-optical (E/O) converter 340 and a respective optical-to-electrical (O/E) converter 342. Likewise, each of the LPR 324, the dRAU 326, the dMRU 328, and the dHRU 330 can include a respective E/O converter 344 and a respective O/E converter 346.

The E/O converter 340 at the DRU 322 is configured to convert the downlink communication signals 320D into downlink optical communication signals 348D for distribution to the LPR 324, the dRAU 326, the dMRU 328, and the dHRU 330 via the optical fiber-based communication medium 338. The O/E converter 346 at each of the LPR 324, the dRAU 326, the dMRU 328, and the dHRU 330 is configured to convert the downlink optical communication signals 348D back to the downlink communication signals 320D. The E/O converter 344 at each of the LPR 324, the dRAU 326, the dMRU 328, and the dHRU 330 is configured to convert the uplink communication signals 320U into uplink optical communication signals 348U. The O/E converter 342 at the DRU 322 is configured to convert the uplink optical communication signals 348U back to the uplink communication signals 320U.

In the context of the present disclosure, a wireless node generally refers to a wireless communication circuit, including at least a processing circuit, a memory circuit, and an antenna circuit, and can be configured to process, transmit, and receive a wireless communication signal. In this regard, any of the radio node 304, the O-RAN RN 312, the LPR 324, the dRAU 326, the dMRU 328, and the dHRU 330 can function as a wireless node, as discussed with more details in FIG. 4, to enable beamforming codebook optimization based on embodiments disclosed herein.

Figure 4:
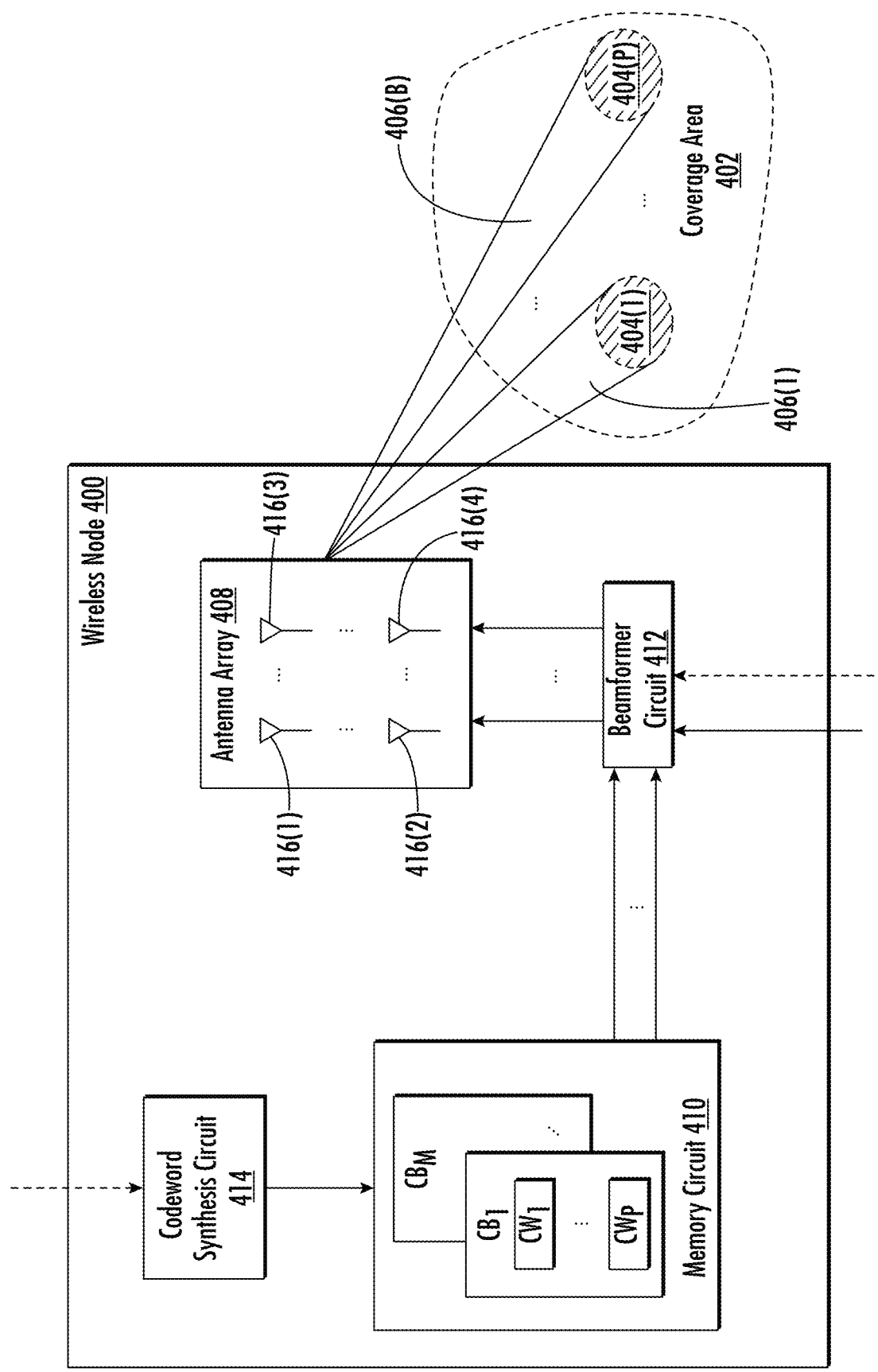
FIG. 4 is a schematic diagram of an exemplary wireless node, which can be provided in the WCS of FIG. 3 to enable beamforming codebook optimization for a coverage area.

FIG. 4 is a schematic diagram of an exemplary wireless node 400 that can be configured according to various embodiments of the present disclosure to enable beamforming codebook optimization in a coverage area 402. More specifically, the coverage area 402 can be divided into a plurality of coverage clusters 404(1)-404(P), and the wireless node 400 is configured to emit a predetermined number of RF beams 406(1)-406(B) (e.g., the reference beams 208(1)-208(C) in FIG. 2B) toward the coverage clusters 404(1)-404(P), respectively.

In an embodiment, the wireless node 400 includes an antenna array 408, a memory circuit 410, a beamformer circuit 412, and a codeword synthesis circuit 414. The antenna array 408 includes a plurality of antenna elements 416(1)-416(4) (although more or fewer may be present). Notably, the antenna elements 416(1)-416(4) can be any type of radiating structure.

The memory circuit 410, which may be a solid-state disc (SSD) flash memory, as an example, is configured to store a plurality of beamforming codebooks $CB_1$-$CB_M$. Each of the beamforming codebooks $CB_1$-$CB_M$ includes a predetermined number of codewords $CW_1$-$CW_P$, each determined to form a respective one of the RF beams 406(1)-406(B).

As noted above, the wireless node 400 is designed to provide communication for a specific area in which user equipment is likely to be found. Current wireless standards contemplate that the wireless node 400 uses beam sweeps to allow initial access by users in the specific area. As noted above, while it is possible to use all antennas in an array when forming a beam, such an approach is energy intensive and incurs a high overhead. Accordingly, as noted above, some beams may be formed by less than all the antennas in an array using codewords that accept a tradeoff between the quality of initial access coverage and a total number of beams. A collection of codewords is formed into a codebook.

Currently, a preliminary initial access codebook is designed according to a few initially known parameters, for example, inside/outside, height of installation, mechanical tilt and orientation, basic coverage area geometry, and the like. This preliminary initial access codebook is static and cannot be adapted to actual conditions without measurements and/or simulation of received signal quality at potential user locations. Because there may be physical barriers such as walls, stairs, or other blocking materials, the codewords of the preliminary initial access codebook may provide uneven signal strengths throughout the coverage area and may have areas of low or no service (e.g., dead zones).

This preliminary initial access codebook may be adapted to a given coverage area using actual measurements (e.g., a physical walkthrough) and/or simulation of received signal quality at potential user locations. However, optimizing a codebook requires a high number of iterations of design and/or test measurements (e.g., on the order of tens of thousands of iterations). A standard walking test may take hours for each iteration, making multiple iterations impractical. Likewise, building a simulation of an entire coverage area is a non-trivial trivial exercise with impractical costs that still need intensive real-environment measurements to be accurate enough for codebook optimization. However, without optimization, sub-areas in the coverage area may be uncovered that are only discovered after installation as users report poor coverage and require troubleshooting or testing to determine the actual cause of the poor coverage. Once the problem is identified, a solution may be the installation of extra remote units with the associated costs. Accordingly, there is room for innovation in codebook optimization.

Exemplary aspects of the present disclosure provide for rapid detection of low coverage sub-areas along with rapid automatic adaption of a codebook. This rapid automatic adaptation is facilitated by placing a plurality of sensors (e.g., Internet of Things (IoT) devices) in the coverage area that provides measurements and feedback to a central processing device to generate an adapted codebook. The use of IoT devices and the methods set forth herein provide relatively quick iterations that allow for rapid optimization of a codebook.

Figure 5:
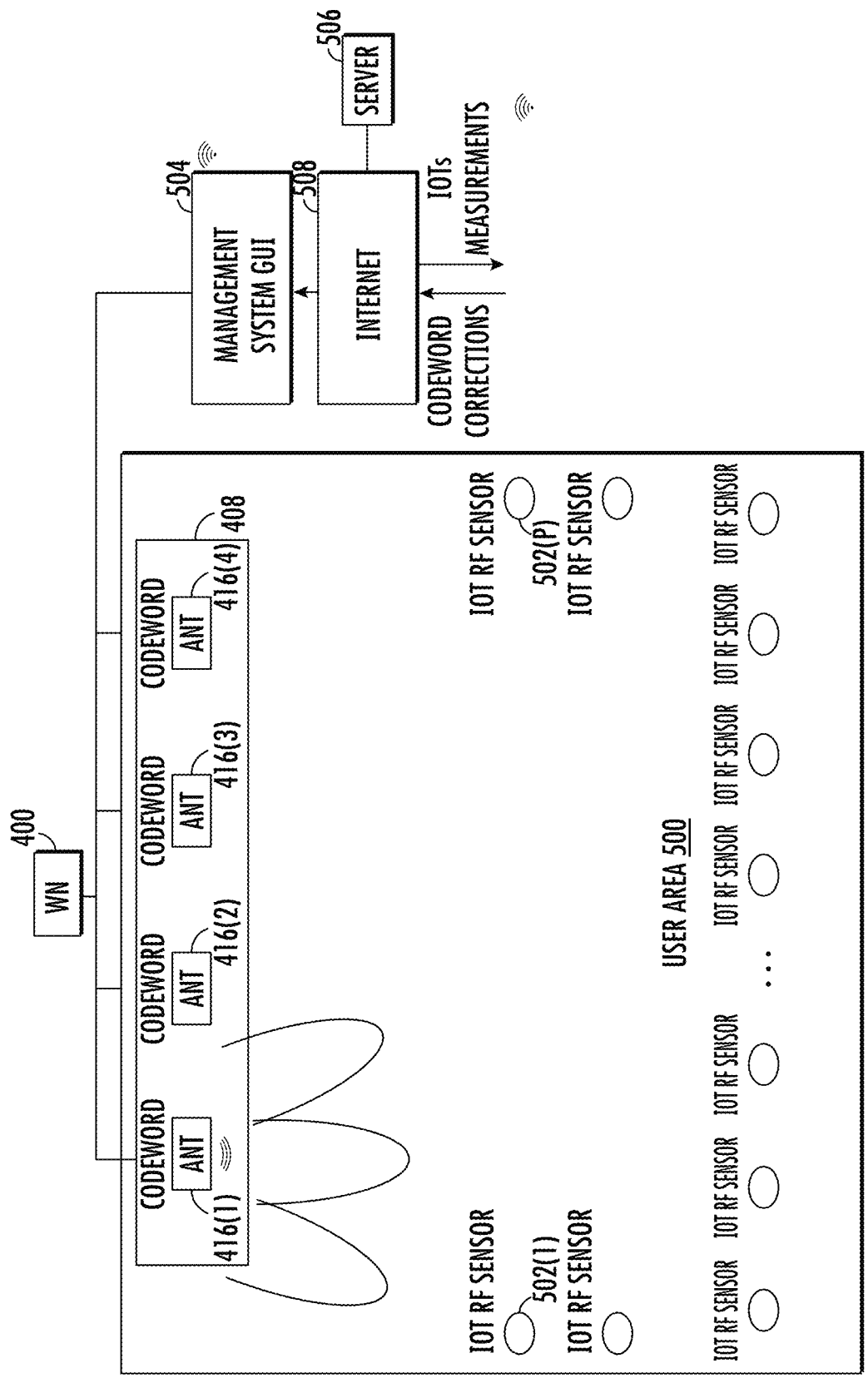
FIG. 5 is a stylized diagram of a coverage area with an antenna array's signal strength being evaluated by a plurality of RF sensors to assist in optimizing a beamforming codebook.

In this regard, FIG. 5 provides a stylized depiction of a user area 500 under test after deployment of a wireless node 400 therein. The wireless node 400 may include an antenna array 408 with antenna elements 416(1)-416(4) (although, again, more or fewer may be present). An installation operator may distribute sensors 502(1)-502(P) throughout the user area 500. In an exemplary aspect, the sensors 502(1)-502(P) may be IoT RF sensors. As such, the sensors 502(1)-502(P) are relatively small, easily portable, and responsive to signals used by the wireless node 400. The installation operator may walk through the user area and place the sensors 502(1)-502(P) in places where users are likely to be. For example, one sensor 502(1)-502(P) may be placed in each office, at various points in a corridor, beside a copy machine, or the like. The wireless node 400 will communicate with the sensors 502(1)-502(P) and receive signal strength measurements therefrom. These measurements may be provided to a remote location for processing through a management system graphic user interface (GUI) 504. In an exemplary aspect, the remote location may be a remote server 506 accessed through the internet 508.

Figure 6:
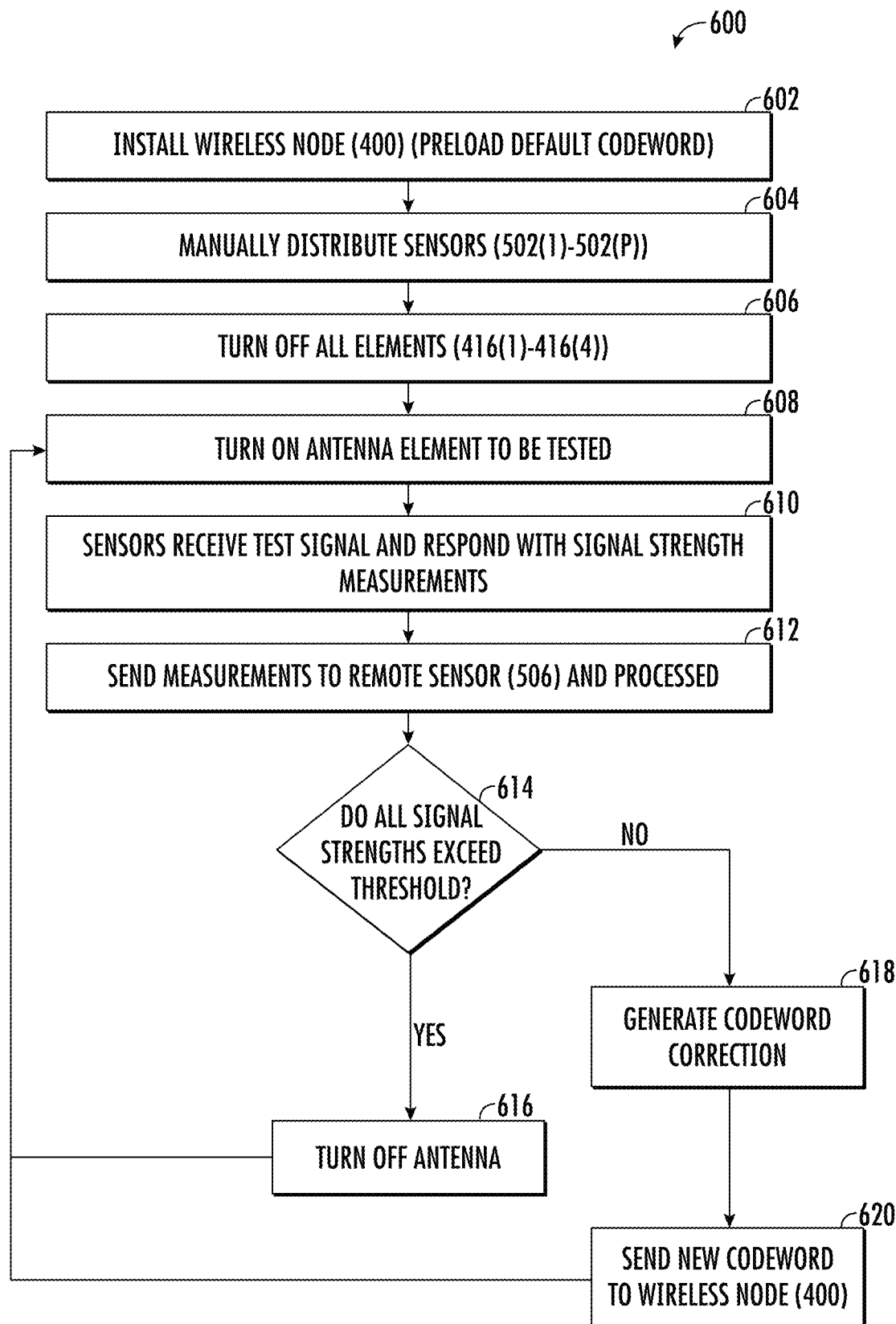
FIG. 6 is a flowchart of an exemplary process that may be employed by the wireless node of FIG. 4 to determine an optimized beamforming codebook responsive to the testing through sensors.

A basic process 600 for codebook optimization is provided with reference to FIG. 6. The process 600 begins with the installation of the wireless node 400 (block 602) and the manual distribution or placement of the sensors 502(1)-502 (P) (block 604). The density of the sensors 502(1)-502(P) may depend on the environment and may not be uniform. Initially, all the antenna elements 416(1)-416(4) are turned off (block 606), and the wireless node 400 may begin with a default or pre-generated initial codebook. An antenna element to be tested is then turned on, and a test signal sent (block 608). The sensors 502(1)-502(P) receive a test signal from the active antenna element and respond with signal strength measurements (block 610). The measurements are sent to the remote server 506 and processed (block 612). The remote server 506 determines if all the signal strengths meet or exceed a predetermined threshold (block 614). If the answer to block 614 is yes, then the codeword is acceptable, the antenna element under test is turned off, and the process is repeated for the next antenna element until all antenna elements are tested (block 616). If, however, the answer to block 614 is no, the remote server 506 generates a codeword correction (block 618) and returns the new codeword to the wireless node 400 (block 620). The wireless node 400 then sends a new test signal using the active antenna element and the new codeword, effectively returning to block 608. Once all the antenna elements are tested, and the adapted codewords generated, a new codebook will be established on the adapted codewords, and normal operation may commence. Having real-time sensors 502(1)-502(P) and ready access to the remote server 506 shortens the time required to iterate through codeword testing and eliminates the need for simulation construction and multiple walk-throughs.

While the process 600 encapsulates the nature of the present disclosure, in the interests of full disclosure, a more lengthy explanation follows. As a point of initial nomenclature: P is defined as the number of IoT sensors (as in 502(1)-502(P)); B is the number of beams per antenna array 408; K is the number of antenna elements 416 in an antenna array 408; $\alpha_b$ is the set of complex coefficients for an array to generate a beam b, where $1 \le b \le B$; $\alpha_b = \{\alpha_{b,1}, \alpha_{b,2}, \ldots, \alpha_{b,K}\}$, where $1 \le b \le B$, $1 \le k \le K$; $\alpha = \{\alpha_1, \alpha_2, \ldots, \alpha_B\} = \{\alpha_{1,1}, \ldots, \alpha_{1,K}, \alpha_{2,1}, \ldots, \alpha_{2,K}, \ldots, \alpha_{B,1}, \ldots, \alpha_{B,K}\}$ (i.e., a set length of B×K values; $f_p$ is a measurement report set by IoT number p, where $1 \le p \le P$; $f_p = \{f_{p,1}, f_{p,2}, \ldots, f_{p,B}\}$ defines the beams transmitted sequentially such that the IoT sensors report the quality of all the received signals; and $f = \{f_1, f_2, \ldots, f_P\} = \{f_{1,1}, \ldots, f_{1,B}, f_{2,1}, \ldots, f_{2,B}, \ldots, f_{P,1}, \ldots, f_{P,B}\}$ is the set length of P×B values.

The received signal quality that is measured by an IoT sensor at a fixed location in a static (i.e., not changing) environment is a function of the beams' coefficients: $f_{p,b} = f_{p,b}(\alpha_b) = f_{p,b}(\alpha_{b,1}, \alpha_{b,2}, \ldots, \alpha_{b,K})$. The function $f_{p,b}(\alpha_b)$ is unknown at the beginning, and this function depends on a location of the IoT sensor, the location and orientation of the active antenna array, and the environment's impact on signal propagation. Further, the function also depends on the beam radiation pattern. During the optimization procedure, these factors are considered to be constant and non-changing, except the radiation beam pattern that will be controlled by $\alpha_b$.

For an iteration i of the optimization process, the wireless node 400 will transmit sequentially new B beams by applying new complex coefficients $\alpha_b^i = \{\alpha_{b,1}^i, \alpha_{b,2}^i, \ldots, \alpha_{b,K}^i\}$ to generate beam b for iteration i.

The reported output of a function $f_{p,b}(\alpha_b)$ can be a single value to represent received signal strength measured in dBm or Watts as measured during beam b transmission, for example, of simple IoT devices. For frequency dependency characterization, each beam can be transmitted at several carrier frequencies, and the IoT sensor will report a set of outputs (i.e., a value for each carrier frequency) $f_{p,b}(\alpha_b)$. More sophisticated IoT sensors may report a channel characteristic to predict the data rate throughput of a mobile device, but such functionality is not central to the present disclosure.

For simplicity of explanation, an IoT sensor for a given beam reports a single value equivalent to a received signal strength. The optimization target is to have maximal high signal coverage in the serving area. That means the objective is to have maximum received signal power at each and any location of each IoT sensor from at least a single beam. Therefore, after receiving a report, the remote server 506 could calculate the best beam for an IoT number p.

$$f_{p,max}(\alpha) = \max(f_{p,1}(\alpha_1), f_{p,2}(\alpha_2), \ldots, f_{p,B}(\alpha_B)).$$

However, a set of beams that are good for some sensors may not be good for a different sensor, and therefore a joint optimization problem may be defined.

Again, for simplicity of explanation and by way of example, to achieve maximization of the weakest received signal, the process may look for optimality for $\alpha$ set that has B×K elements. To avoid a trivial but not acceptable solution of running up the magnitude of $\alpha_{b,k}$ complex coefficients, a requirement that $|\alpha_{b,k}| \le 1$ be true can exist without losing generality.

$$\hat{\alpha} = \arg\max_{|\alpha_{b,k}| \le 1} \min_{1 \le p \le P} (f_{p,max}(\alpha))$$

To avoid blind or dead spots, there may be a requirement to have reported received signal strength above a threshold $T_{thr}$ at least with one of B beams. This requirement can be expanded to a requirement of having at least one additional beam with reported received signal strength above a threshold $T_{thr2} \le T_{thr}$ to support non-interrupted user mobility. More advanced requirements can be defined without departing from the present disclosure.

Returning to the explanation, and under the assumed requirement of just one beam received above $T_{thr}$ strength at any IoT sensor p noted as condition $C_p$.

$$C_p = \begin{cases} 1, & \text{if } \max(f_{p,1}, f_{p,2}, \ldots, f_{p,B}) \ge T_{thr} \\ 0, & \text{otherwise} \end{cases}$$

Overall coverage can be described by joint condition:

$$C = \begin{cases} 1, & \text{if } C_p = 1 \lor 1 \le p \le P \\ 0, & \text{otherwise} \end{cases} \text{ or}$$

$$C = \begin{cases} 1, & \text{if } \sum_{p=1}^{P} C_p = P \\ 0, & \text{otherwise} \end{cases}$$

Now we can define the constrained optimization problem:

$$\hat{\alpha} = \arg\max_{|\alpha_{b,k}| \le 1} \min_{1 \le p \le P} (f_{p,max}(\alpha))$$

Subject to:

$C = 1$, where $C = \begin{cases} 1, & \text{if } \sum_{p=1}^{P} C_p = P \\ 0, & \text{otherwise} \end{cases}$, $C_p = \begin{cases} 1, & \text{if } \max(f_{p,1}, f_{p,2}, \dots, f_{p,B}) \ge T_{thr} \\ 0, & \text{otherwise} \end{cases}$ Thus, the present disclosure contemplates processing/communication/management software, sensing, and communication hardware by temporarily deploying IoT sensors and utilizing an iterative optimization process that includes real-environment measurements at each iteration in the loop.

Aspects of the present disclosure may be extended to generating multiple codebooks simultaneously for multiple wireless nodes 400. In such a circumstance, there are more optimization parameters but the same number of functions according to the number of sensors 502(1)-502(P). Under the assumption that there are N wireless nodes 400, planning to have $B_n$ beams per wireless node 400 $n$, $1 \le n \le N$. The counting of beams for all wireless nodes 400 may be concatenated:

$$\{\breve{b}\} = \left\{1, 2, \dots, B_1, (B_1+1), (B_1+2), \dots, \right.$$
$$\left. (B_1+B_2), \dots, \left(\sum_{n=1}^{N-1} B_n + 1\right), \left(\sum_{n=1}^{N-1} B_n + 2\right), \dots, \left(\sum_{n=1}^{N-1} B_n + B_N\right)\right\}$$

for $1 \le \breve{b} \le \breve{B}$, where $\breve{B} = \sum_{n=1}^{N} B_n$ with beams $1 \le \breve{b} \le B_1$, transmitted from base station 1 and beams $(\sum_{m=1}^{n-1} B_n + 1) \le \breve{b} \le (\sum_{m=1}^{n} B_n)$, transmitted by base station n.

An indicator function may be defined as:

$$I_n(\breve{b}) = \begin{cases} 1, & \text{if } \left(\sum_{m=1}^{n-1} B_n + 1\right) \le \breve{b} \le \left(\sum_{m=1}^{n} B_n\right) \\ 0, & \text{otherwise} \end{cases}$$

$\alpha = \{\alpha_1, \alpha_2, \dots, \alpha_{\breve{B}}\} = \{\alpha_{1,1}, \dots, \alpha_{1,K}, \alpha_{2,1}, \dots, \alpha_{2,K}, \dots, \alpha_{\breve{B},1}, \dots, \alpha_{\breve{B},K}\}$, —set length of $(\sum_{n=1}^{N} B_n \times K) = \breve{B} \times K$ values.

$$f_{p,max}(\alpha) = \max\left(f_{p,1}(\alpha_1), f_{p,2}(\alpha_2), \dots, f_{p,\breve{B}}(\alpha_{\breve{B}})\right)$$

Figure 7:
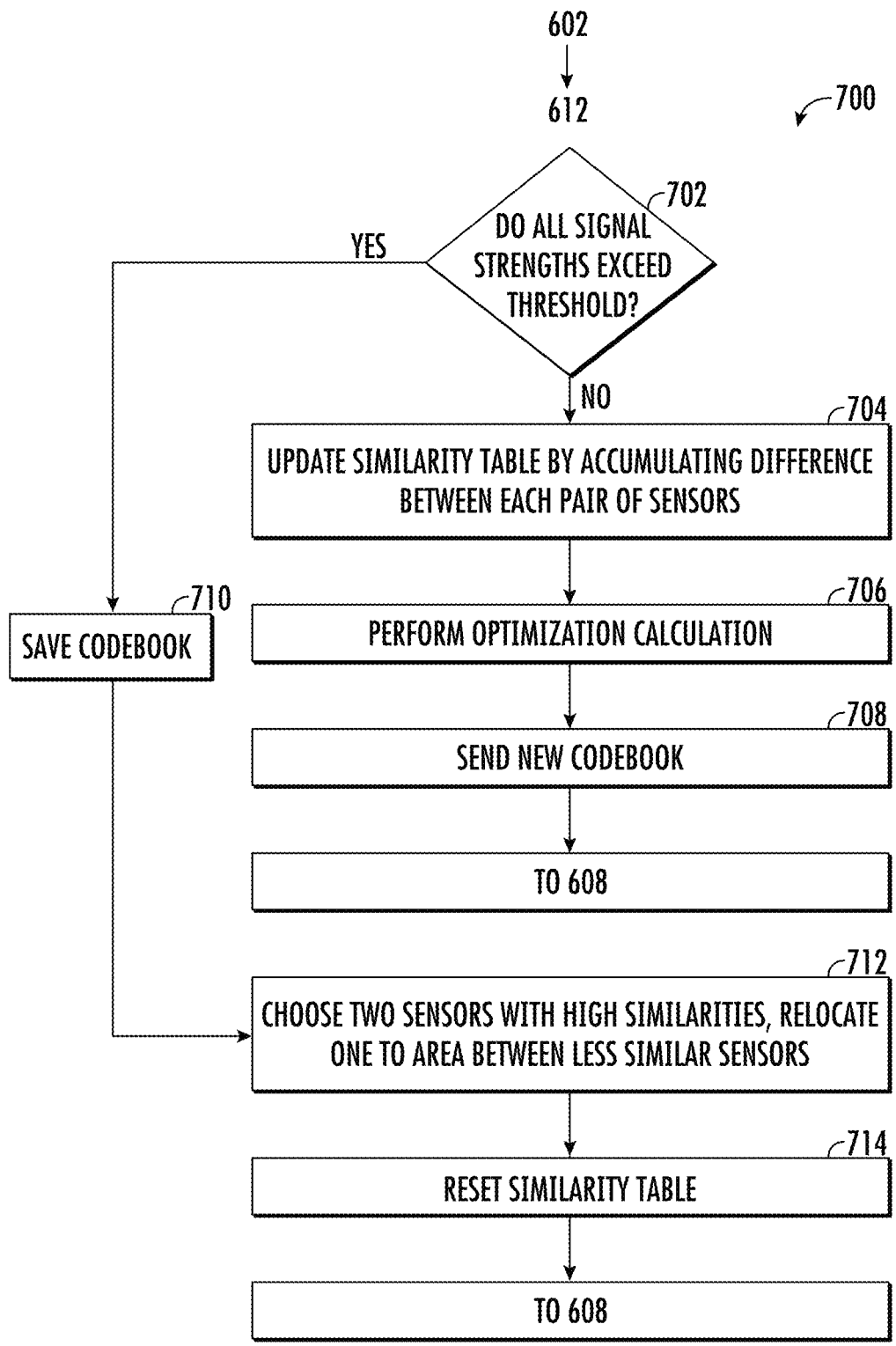
FIG. 7 is a flowchart of an alternate exemplary process that may be employed by the wireless node of FIG. 4 to determine an optimized beamforming codebook responsive to the testing through sensors.

A variation on the process 600 is provided by process 700 with reference to FIG. 7. Specifically, the process 700 begins similarly but makes adjustments in the placement of the sensors 502(1)-502(P) to assist in reducing a number of required sensors 502(1)-502(P) while making sure that maximal areas are tested. The process 700 introduces the concept of a similarity table that contemplates how similarly situated each of the sensors 502(1)-502(P) is. The similarity table may start with the assumption that the sensors are all similar. The process 700 begins similarly to the process 600 but diverges after testing to see if all signal strengths exceed the predetermined threshold (block 702). If the answer is no, then the remote server 506 updates the similarity table by accumulating a difference between each pair of sensors (block 704). The remote server 506 then performs an optimization calculation (block 706) and generates a new codebook. The new codebook is sent to the wireless node 400 (block 708), and the process 700 returns to block 608 to iterate through again until all beams are tested and optimized.

If, however, the answer to block 702 is yes, then the process 700 saves the codebook (block 710) and, chooses two sensors with high similarities, relocates one manually to an area between less similar sensors (block 712). The remote server 506 resets the similarity table (block 714), and the process 700 starts over at block 608.

Figure 8:
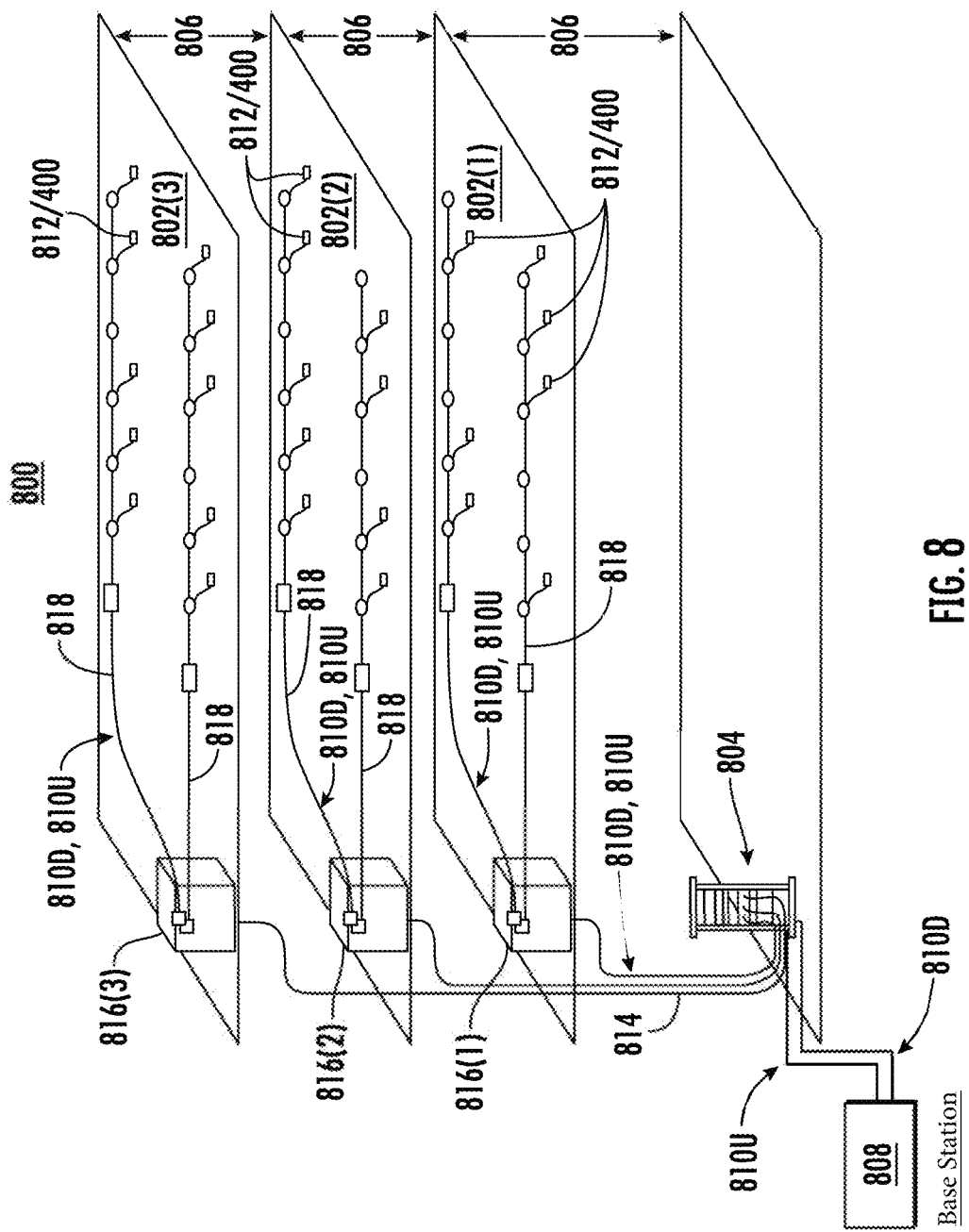
FIG. 8 is a partial schematic cut-away diagram of an exemplary building infrastructure in a WCS, such as the WCS of FIG. 3 that includes the wireless node of FIG. 4.

The WCS 300 of FIG. 3, which can include the wireless node 400 in FIG. 4, can be provided in an indoor environment, as illustrated in FIG. 8. FIG. 8 is a partial schematic cut-away diagram of an exemplary building infrastructure 800 in a WCS, such as the WCS 300 of FIG. 3 that includes the wireless node 400 of FIG. 4 to enable beamforming codebook optimization. The building infrastructure 800 in this embodiment includes a first (ground) floor 802(1), a second floor 802(2), and a third floor 802(3). The floors 802(1)-802(3) are serviced by a central unit 804 to provide antenna coverage areas 806 in the building infrastructure 800. The central unit 804 is communicatively coupled to a base station 808 to receive downlink communication signals 810D from the base station 808. The central unit 804 is communicatively coupled to a plurality of remote units 812 to distribute the downlink communication signals 810D to the remote units 812 and to receive uplink communication signals 810U from the remote units 812, as previously discussed. The downlink communication signals 810D and the uplink communication signals 810U communicated between the central unit 804 and the remote units 812 are carried over a riser cable 814. The riser cable 814 may be routed through interconnect units (ICUs) 816(1)-816(3) dedicated to each of the floors 802(1)-802(3) that route the downlink communication signals 810D and the uplink communication signals 810U to the remote units 812 and also provide power to the remote units 812 via array cables 818.

Figure 9:
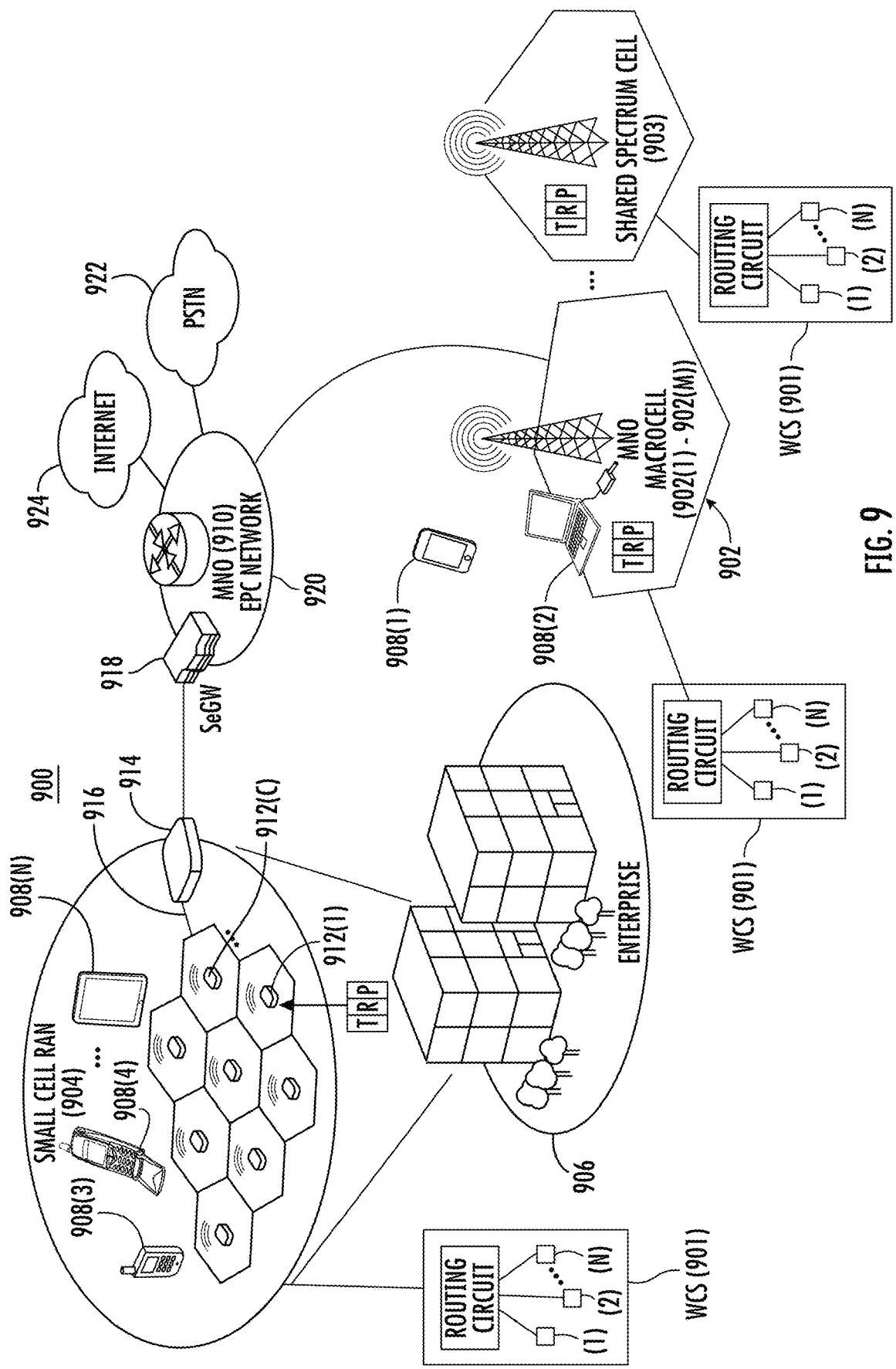
FIG. 9 is a schematic diagram of an exemplary mobile telecommunication environment that can include the WCS of FIG. 3 that includes the wireless node of FIG. 4.

The WCS 300 of FIG. 3 and the wireless node 400 of FIG. 4, configured to enable beamforming codebook optimization, can also be interfaced with different types of radio nodes of service providers and/or supporting service providers, including macrocell systems, small cell systems, and remote radio heads (RRH) systems, as examples. For example, FIG. 9 is a schematic diagram of an exemplary mobile telecommunication environment 900 (also referred to as "environment 900") that includes radio nodes and cells that may support shared spectrum, such as unlicensed spectrum, and can be interfaced to shared spectrum WCSs 901 supporting the coordination of distribution of shared spectrum from multiple service providers to remote units to be distributed to subscriber devices. The shared spectrum WCSs 901 can include the WCS 300 of FIG. 3 that includes the wireless node 400 of FIG. 4 as an example.

The environment 900 includes exemplary macrocell RANs 902(1)-902(M) ("macrocells 902(1)-902(M)") and an exemplary small cell RAN 904 located within an enterprise environment 906 and configured to service mobile communication between a user mobile communication device 908(1)-908(N) to a mobile network operator (MNO) 910. A serving RAN for the user mobile communication devices 908(1)-908(N) is a RAN or cell in the RAN in which the user mobile communication devices 908(1)-908(N) have an established communication session with the exchange of mobile communication signals for mobile communication. Thus, a serving RAN may also be referred to herein as a serving cell. For example, the user mobile communication devices 908(3)-908(N) in FIG. 9 are being serviced by the small cell RAN 904, whereas the user mobile communication devices 908(1) and 908(2) are being serviced by the macrocell 902. The macrocell 902 is an MNO macrocell in this example. However, a shared spectrum RAN 903 (also referred to as "shared spectrum cell 903") includes a macrocell in this example and supports communication on frequencies that are not solely licensed to a particular MNO, such as CBRS for example, and thus may service user mobile communication devices 908(1)-908(N) independent of a particular MNO. For example, the shared spectrum cell 903 may be operated by a third party that is not an MNO and wherein the shared spectrum cell 903 supports CBRS. Also, as shown in FIG. 9, the MNO macrocell 902, the shared spectrum cell 903, and/or the small cell RAN 904 can interface with a shared spectrum WCS 901, supporting the coordination of distribution of shared spectrum from multiple service providers to remote units to be distributed to subscriber devices. The MNO macrocell 902, the shared spectrum cell 903, and the small cell RAN 904 may be neighboring radio access systems to each other, meaning that some or all can be in proximity to each other such that a user mobile communication device 908(1)-908(N) may be able to be in communication range of two or more of the MNO macrocell 902, the shared spectrum cell 903, and the small cell RAN 904 depending on the location of the user mobile communication devices 908(1)-908(N).

In FIG. 9, the mobile telecommunication environment 900 in this example is arranged as an LTE system as described by the Third Generation Partnership Project (3GPP) as an evolution of the GSM/UMTS standards (Global System for Mobile Communication/Universal Mobile Telecommunication System). However, it is emphasized that the aspects described herein may also apply to other network types and protocols. The mobile telecommunication environment 900 includes the enterprise environment 906, in which the small cell RAN 904 is implemented. The small cell RAN 904 includes a plurality of small cell radio nodes 912(1)-912(C). Each small cell radio node 912(1)-912(C) has a radio coverage area (graphically depicted in the drawings as a hexagonal shape) that is commonly termed a "small cell." A small cell may also be referred to as a femtocell or, using terminology defined by 3GPP, as a Home Evolved Node B (HeNB). In the description that follows, the term "cell" typically means the combination of a radio node and its radio coverage area unless otherwise indicated.

In FIG. 9, the small cell RAN 904 includes one or more service nodes (represented as a single services node 914) that manage and control the small cell radio nodes 912(1)-912(C). In alternative implementations, the management and control functionality may be incorporated into a radio node, distributed among nodes, or implemented remotely (i.e., using infrastructure external to the small cell RAN 904). The small cell radio nodes 912(1)-912(C) are coupled to the services node 914 over a direct or local area network (LAN) connection 916 as an example, typically using secure IPsec tunnels. The small cell radio nodes 912(1)-912(C) can include multi-operator radio nodes. The services node 914 aggregates voice and data traffic from the small cell radio nodes 912(1)-912(C) and provides connectivity over an IPsec tunnel to a security gateway (SeGW) 918 in a network 920 (e.g., evolved packet core (EPC) network in a 4G network, or 5G Core in a 5G network) of the MNO 910. The network 920 is typically configured to communicate with a public switched telephone network (PSTN) 922 to carry circuit-switched traffic and communicate with an external packet-switched network such as the Internet 924.

The environment 900 also generally includes a node (e.g., eNodeB or gNodeB) base station, or "macrocell" 902. The radio coverage area of the macrocell 902 is typically much larger than that of a small cell, where the extent of coverage often depends on the base station configuration and the surrounding geography. Thus, a given user mobile communication device 908(3)-908(N) may achieve connectivity to the network 920 (e.g., EPC network in a 4G network or 5G Core in a 5G network) through either a macrocell 902 or small cell radio node 912(1)-912(C) in the small cell RAN 904 in the environment 900.

Figure 10:
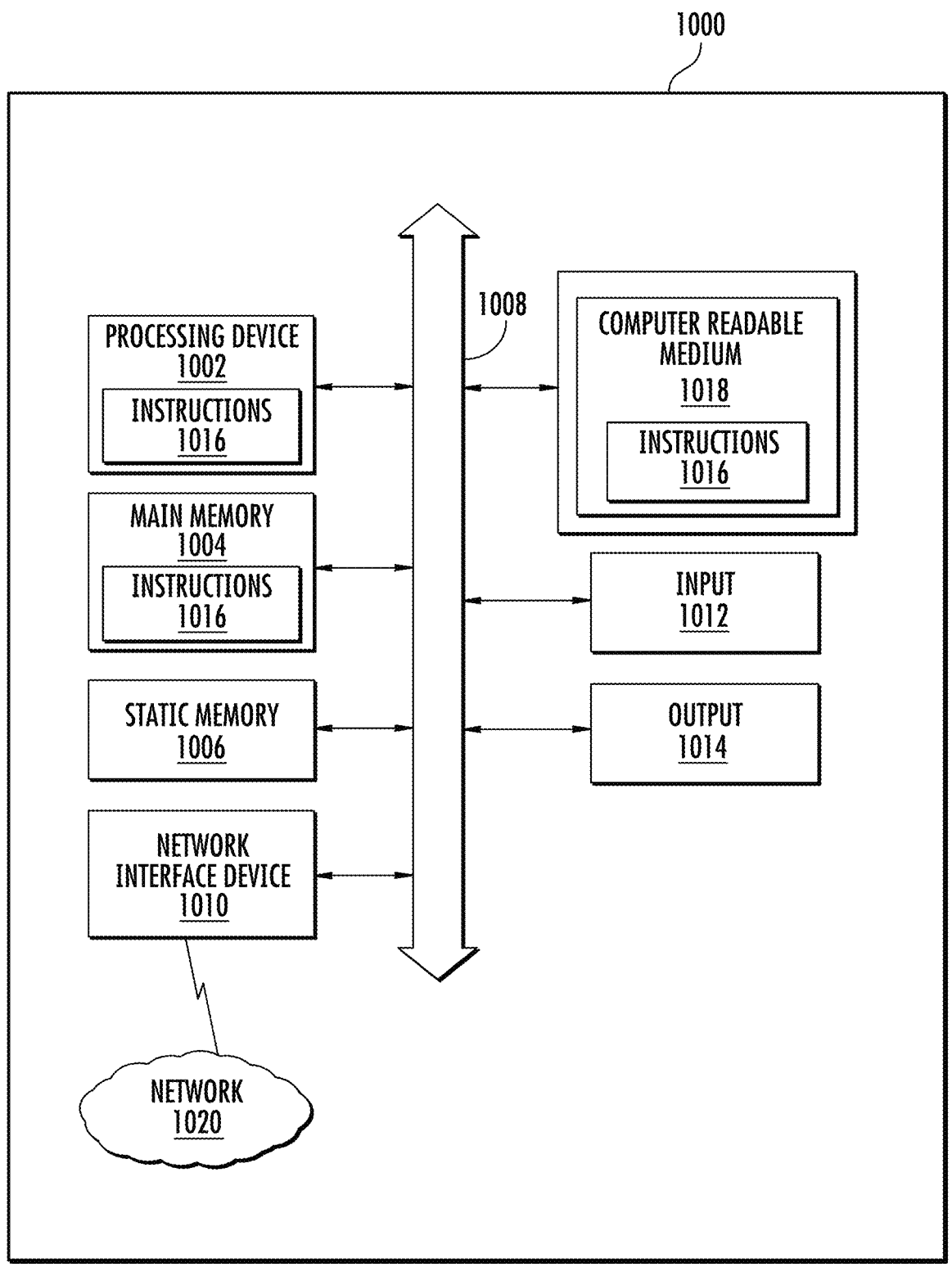
FIG. 10 is a schematic diagram of a representation of an exemplary computer system that can be included in or interfaced with any of the components in the WCS of FIG. 3 and the wireless node in FIG. 4, wherein the exemplary computer system is configured to execute instructions from an exemplary computer-readable medium.

Any of the circuits in the WCS 300 of FIG. 3 and the wireless node 400 of FIG. 4, such as the beamformer circuit 412, or the remote server 506 can include a computer system 1000, such as that shown in FIG. 10, to carry out their functions and operations. With reference to FIG. 10, the computer system 1000 includes a set of instructions for causing the multi-operator radio node component(s) to provide its designed functionality and the circuits discussed above. The multi-operator radio node component(s) may be connected (e.g., networked) to other machines in a LAN, an intranet, an extranet, or the Internet. The multi-operator radio node component(s) may operate in a client-server network environment or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The multi-operator radio node component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server, edge computer, or a user's computer. The exemplary computer system 1000 in this embodiment includes a processing circuit or processor 1002, a main memory 1004 (e.g., read-only memory (ROM), flash memory, dynamic random access memory (DRAM) such as synchronous DRAM (SDRAM), etc.), and a static memory 1006 (e.g., flash memory, static random access memory (SRAM), etc.), which may communicate with each other via a data bus 1008. Alternatively, the processing circuit 1002 may be connected to the main memory 1004 and/or static memory 1006 directly or via some other connectivity means.

The processing circuit 1002 may be a controller, and the main memory 1004 or static memory 1006 may be any type of memory.

The processing circuit 1002 represents one or more general-purpose processing circuits such as a microprocessor, central processing unit, or the like. More particularly, the processing circuit 1002 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing circuit 1002 is configured to execute processing logic in instructions 1016 for performing the operations and steps discussed herein.

The computer system 1000 may further include a network interface device 1010. The computer system 1000 also may or may not include an input 1012 to receive input and selections to be communicated to the computer system 1000 when executing instructions. The computer system 1000 also may or may not include an output 1014, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1000 may or may not include a data storage device that includes instructions 1016 stored in a computer-readable medium 1018. The instructions 1016 may also reside, completely or at least partially, within the main memory 1004 and/or within the processing circuit 1002 during execution thereof by the computer system 1000, the main memory 1004 and the processing circuit 1002 also constituting the computer-readable medium 1018. The instructions 1016 may further be transmitted or received over a network 1020 via the network interface device 1010.

While the computer-readable medium 1018 is shown in an exemplary embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the processing circuit and that causes the processing circuit to perform any one or more of the methodologies of the embodiments disclosed herein. The term "computer-readable medium" shall accordingly be taken to include, but not be limited to, solid-state memories, optical and magnetic medium, and carrier wave signals.

Note that as an example, any "ports," "combiners," "splitters," and other "circuits" mentioned in this description may be implemented using Field Programmable Logic Array(s) (FPGA(s)) and/or a digital signal processor(s) (DSP(s)), and therefore, may be embedded within the FPGA or be performed by computational processes.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product or software that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read-only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations, and variations of the disclosed embodiments incorporating the spirit and substance of the invention may occur to persons skilled in the art, the invention should be construed to include everything within the scope of the appended claims and their equivalents.

We claim:

1. A wireless node, comprising:
   an antenna array comprising a plurality of antenna elements and configured to emit a predetermined number of radio frequency (RF) beams in a coverage area; and
   a codeword synthesis circuit configured to:
   send a first beam formed by a first codeword in a default codebook;

send measurements, responsive to the first beam, from sensors in a coverage area to a remote server;

iterate through multiple beams and send measurements from the multiple beams to the remote server;

receive a new codebook from the remote server;

store the new codebook in a memory, test codewords in the new codebook, generate new measurements from the sensors, and send the new measurements to the remote server, wherein the new codebook comprises at least one new codeword based on the measurements.

2. The wireless node of claim 1, further comprising a beamformer circuit coupled to the antenna array.

3. The wireless node of claim 1, wherein the measurements comprise signal strength measurements.

4. The wireless node of claim 1, wherein the sensors comprise Internet of Things (IoT) devices.

5. A method for optimizing a codebook for radio frequency (RF) beamforming in a wireless communication system (WCS), comprising:

distributing sensors in a coverage area;

sending, using an antenna array, a first beam formed by a first codeword in a default codebook;

sending measurements, responsive to the first beam, from the sensors in the coverage area to a remote server; and receiving a new codebook from the remote server.

6. The method of claim 5, further comprising initially turning off all antenna elements in the antenna array.

7. The method of claim 5, further comprising sending additional beams by iterating through codewords in the codebook.

8. The method of claim 7, further comprising sending measurements for additional codewords to the remote server.

9. The method of claim 5, further comprising storing the new codebook in a memory.

10. A method for optimizing a codebook for radio frequency (RF) beamforming in a wireless communication system (WCS), comprising:

sending, using an antenna array, a first beam formed by a first codeword in a default codebook;

sending measurements, responsive to the first beam, from sensors in a coverage area to a remote server;

determining if the measurements exceed a threshold; and receiving a new codebook from the remote server.

11. The method of claim 10, further comprising generating a new codeword when the measurements do not exceed the threshold.

* * * * *